US009918431B2

(12) United States Patent
McIlhatton

(10) Patent No.: US 9,918,431 B2
(45) Date of Patent: *Mar. 20, 2018

(54) APPARATUSES AND METHODS FOR MOVING WINDROW ENDS INWARD

(71) Applicant: Thomas C. McIlhatton, Fresno, CA (US)

(72) Inventor: Thomas C. McIlhatton, Fresno, CA (US)

(*) Notice: Subject to any disclaimer, the term of this patent is extended or adjusted under 35 U.S.C. 154(b) by 11 days.

This patent is subject to a terminal disclaimer.

(21) Appl. No.: 15/213,042

(22) Filed: Jul. 18, 2016

(65) Prior Publication Data

US 2016/0360700 A1 Dec. 15, 2016

Related U.S. Application Data

(63) Continuation of application No. 14/483,078, filed on Sep. 10, 2014, now Pat. No. 9,398,742.

(60) Provisional application No. 61/876,312, filed on Sep. 11, 2013.

(51) Int. Cl.
*A01D 51/00* (2006.01)
*A01D 46/26* (2006.01)

(52) U.S. Cl.
CPC .......... *A01D 51/002* (2013.01); *A01D 46/26* (2013.01)

(58) Field of Classification Search
CPC ........................................ A01D 51/00–51/007

USPC ................. 56/192, 328.1; 405/179; 172/509
See application file for complete search history.

(56) References Cited

U.S. PATENT DOCUMENTS

| | | | |
|---|---|---|---|
| 749,572 A | 1/1904 | Miller | |
| 2,614,376 A * | 10/1952 | Madsen | A01D 45/22 56/192 |
| 2,687,605 A * | 8/1954 | Persons | A01D 25/02 171/104 |
| 3,698,169 A | 10/1972 | Simpson | |
| 4,741,148 A | 5/1988 | Ekas, Sr. et al. | |
| 5,513,484 A | 5/1996 | Zehavi et al. | |
| 6,139,223 A * | 10/2000 | Snyder | A01C 5/066 172/509 |
| 9,398,742 B2 * | 7/2016 | McIlhatton | A01D 51/002 |
| 2006/0218890 A1 | 10/2006 | Welch | |

* cited by examiner

*Primary Examiner* — John G Weiss
(74) *Attorney, Agent, or Firm* — Sherrie Flynn; Coleman & Horowitt LLP

(57) ABSTRACT

Apparatuses for and methods of moving the ends of windrows inward are disclosed. The apparatuses of the present invention include a front end, a rear end and two opposing sides, the front end configured to be wider than the rear end, two skids attached to the two opposing sides, a gate rotatably attached to the rear end and configured to cover an opening in the rear end, a gate cylinder operably attached to the gate and configured to close the gate to collect fruit and/or nuts within the apparatus, and open the gate to distribute the fruit and/or nuts outside of the apparatus, thus eliminating the need to hand rake the ends of the windrows inward or to blow the ends of the windrow inward with a hand blower.

13 Claims, 19 Drawing Sheets

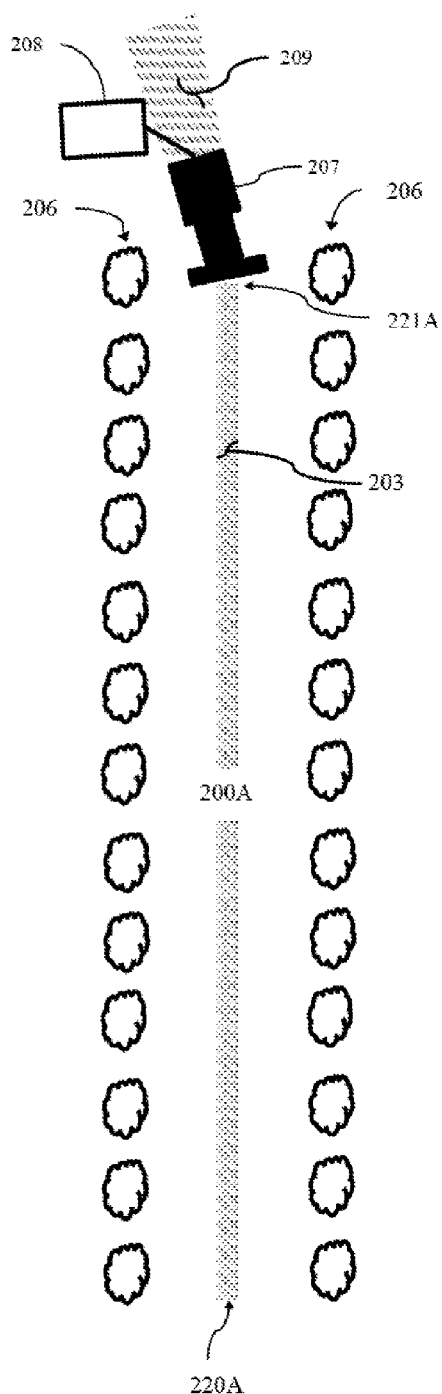 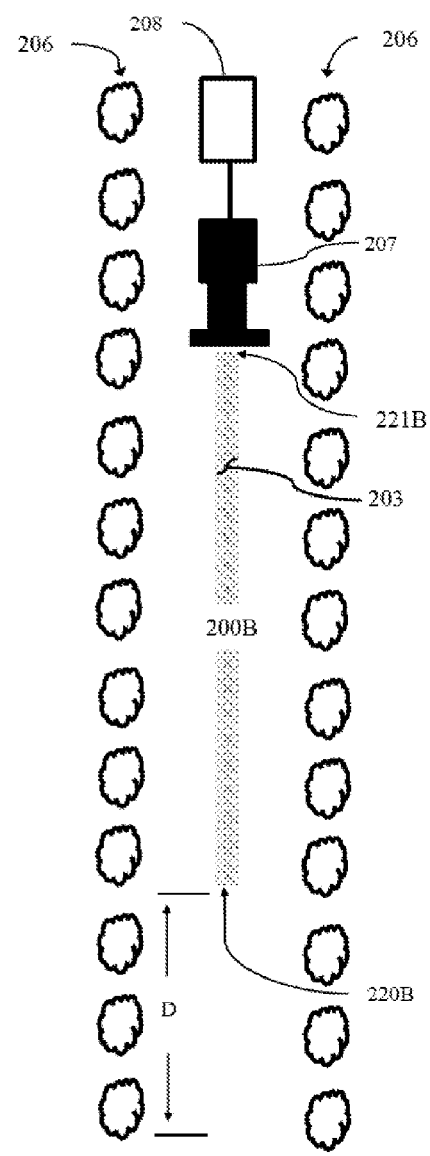
Fig. 2A                   Fig. 2B

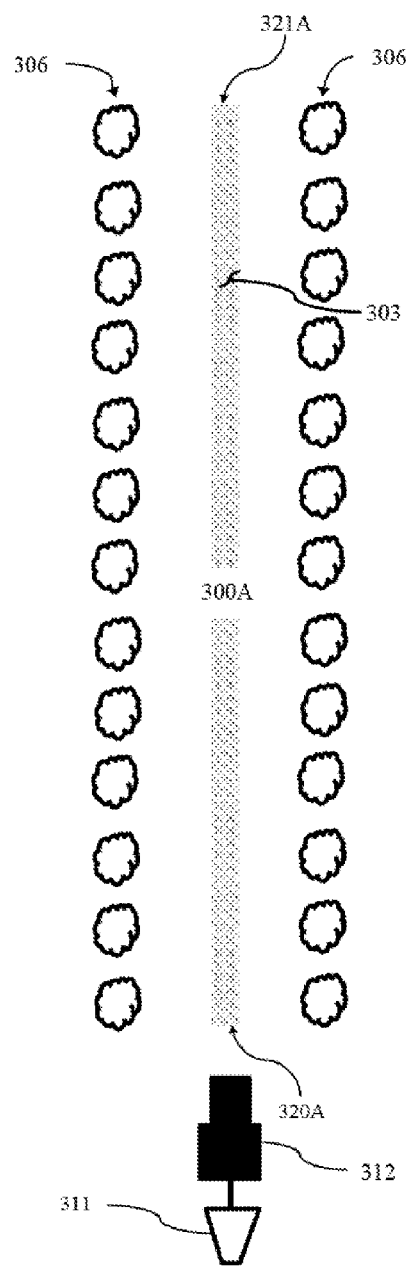
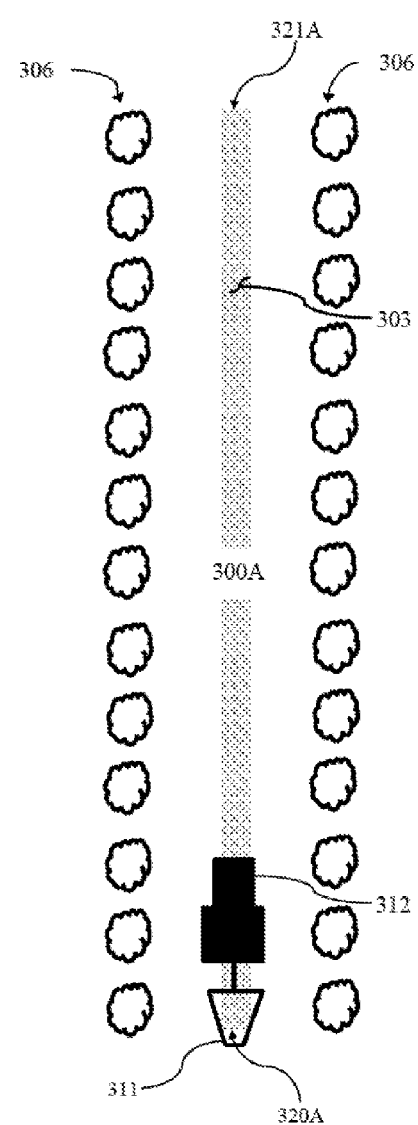
FIG. 3A
FIG. 3B

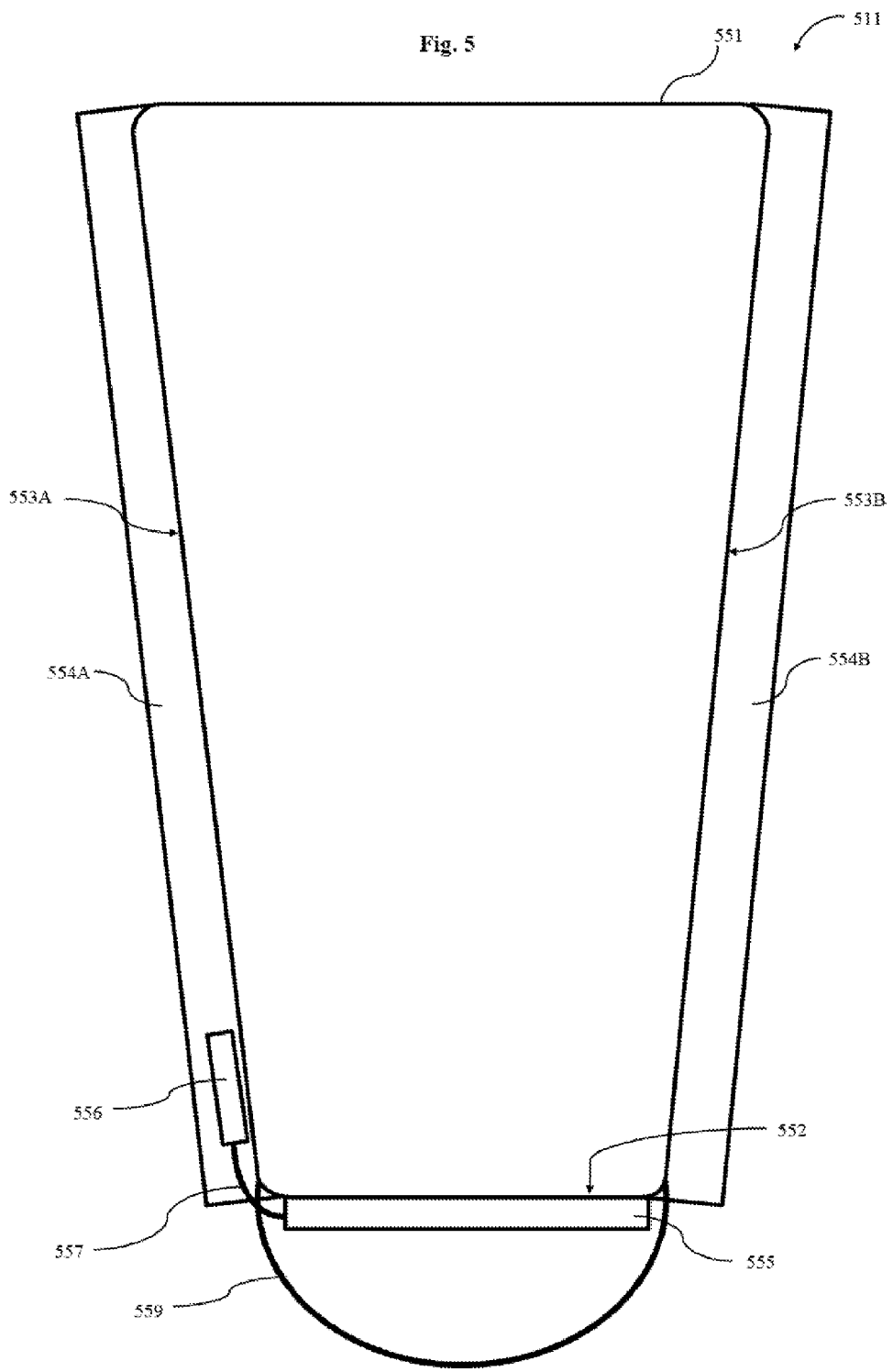

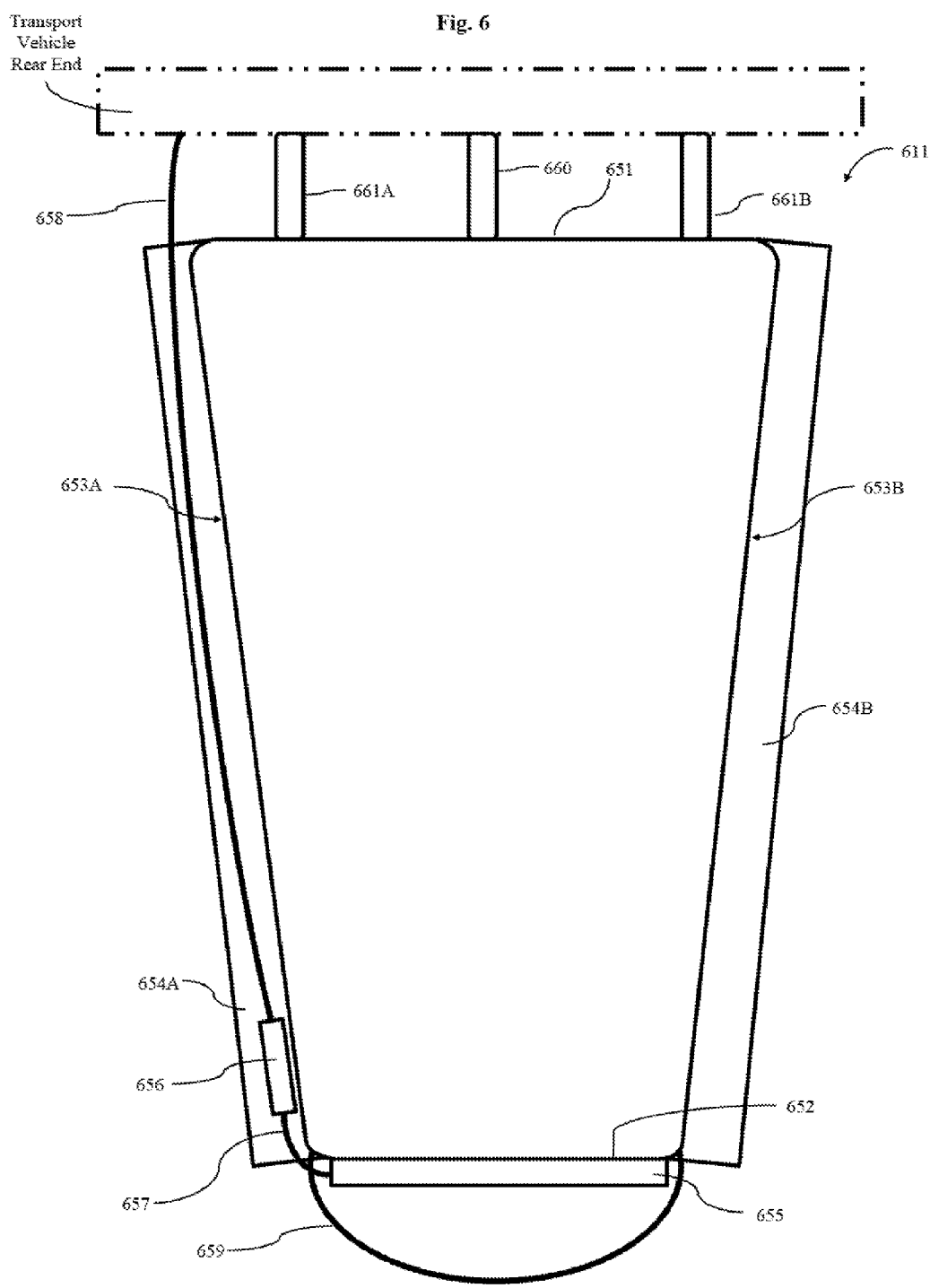

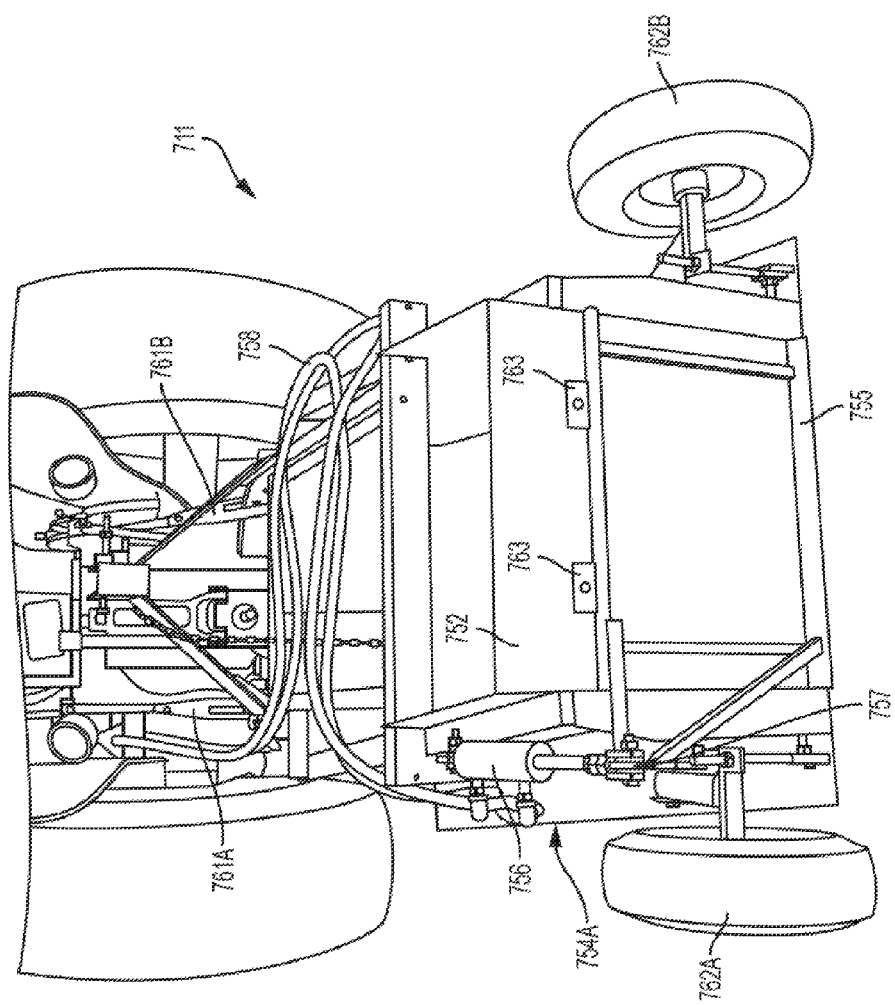

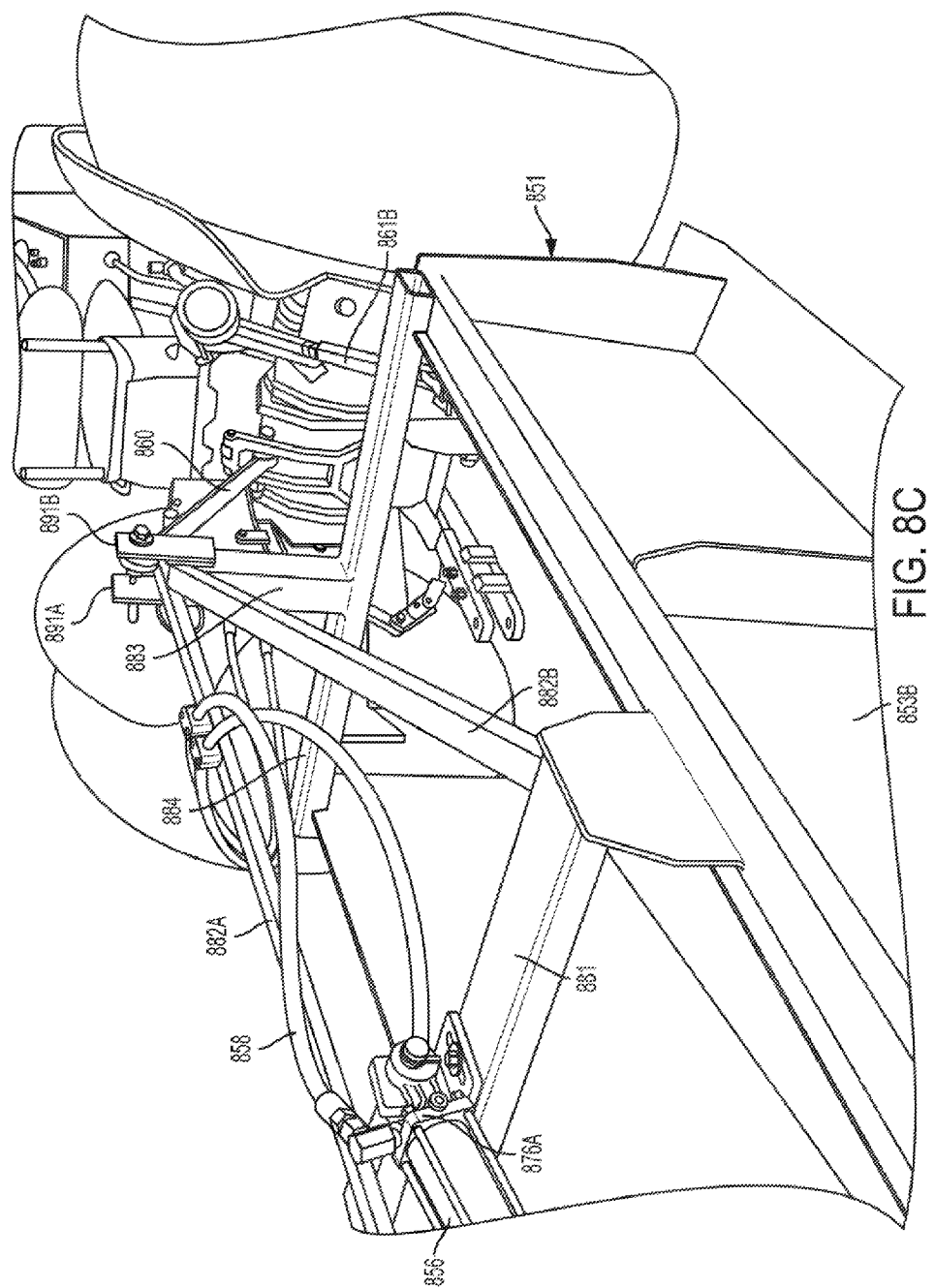

APPARATUSES AND METHODS FOR MOVING WINDROW ENDS INWARD

CROSS-REFERENCE TO RELATED APPLICATIONS

This application a continuation of U.S. application Ser. No. 14/483,078, filed Sep. 10, 2014, to be issued on Jul. 26, 2016 as U.S. Pat. No. 9,398,742, which claims priority under 35 U.S.C. § 119(e) to U.S. Provisional Patent Application No. 61/876,312, filed Sep. 11, 2013.

FIELD OF INVENTION

The subject disclosure generally relates to agricultural apparatuses and methods, and more specifically to apparatuses and methods for efficiently and effectively sweeping fruit and/or nuts from windrow ends inward after the fruit or nuts have been shaken from trees, so as to facilitate removal by harvesting equipment.

DISCUSSION OF THE BACKGROUND

For the purposes of this specification, the present invention will be described in relation to harvesting nuts (e.g., almonds, walnuts, pecans, hazelnuts, etc.). However it should be understood that the invention is not so limited, and may be applied and/or used to collect any type of fruit or nuts that may be shaken from trees, blown or swept into windrows and then harvested.

The conventional method for harvesting nuts from trees consists of the following steps: (1) shaking the trees with a shaker machine causing the nuts to fall from the trees; (2) sweeping the nuts with a sweeper and/or blower vehicle to create one or more windrows (a row of nuts between two rows of trees; (3) positioning a harvester machine over and/or near one end of a windrow so that the windrow is completely beneath and in between the wheels of the harvester; and (4) driving the harvester along the length of the windrow so as to collect the nuts by shooting them straight out from behind the harvester and into a nut trailer towed behind the harvester.

Referring to FIG. 1A, therein are shown nuts 103A shaken from rows of trees 106 in a scattered pattern 100A as described in step (1) above. FIG. 1B shows the windrow 100B created between rows of trees 106 after the nuts 103B have been swept with a sweeper or blower vehicle as described in step (2) above. The nuts in the windrow may then be collected as described in steps (3)-(4) using a conventional harvester machine and a trailer towed behind the harvester. However, a problem arises if the harvester and the accompanying nut trailer are not inline, because many nuts will not land in the trailer as the harvester shoots them straight out from behind. This problem commonly arises when a harvester begins to turn inward towards one of the two ends 120 or 121 of the windrow 100B of FIG. 1B.

The problem is illustrated in FIG. 2A. Although the harvester 207 has already begun picking up nuts 203 from the end 221A of windrow 200A, the trailer 208 has not yet completed the turn to windrow 200A. As a result, rather than landing in the trailer 208, the nuts 203 gathered by the harvester 207 undesirably scatter on the ground behind the harvester (see, e.g., scattered nuts 209). A similar "outward" problem occurs at the other end 220A of the windrow 200A since the harvester 207 needs to turn out of the windrow 200A towards an adjacent windrow prior to collecting all of the nuts 203. To gather all of the nuts 203 at end 220A of windrow 200A, the harvester 207 would undesirably have to back up to pick up the nuts 203.

Referring now to FIG. 2B, it is shown therein that because of the configuration of a typical orchard having rows of trees 206, and the configuration of the harvester 207 and trailer 208, the harvester 207 and trailer 208 will not be inline until the harvester 207 and trailer 208 have traveled into the windrow 200B a distance D equal to their combined length. Accordingly, before the harvester 207 and trailer 208 begin to collect nuts 203, the ends 220A, 221A of FIG. 2A of the windrow 200A are typically brought inward the distance D so as to form a shortened windrow 200B with repositioned ends 220B, 221B as shown in FIG. 2B. As a result, so long as the ends 220A, 221A are brought in at least by the combined length D of the harvester 207 and trailer 208, the harvester 207 will remain aligned with the trailer 208 throughout the process of collecting the nuts in shortened windrow 200B.

Currently, moving the ends of a windrow inward undesirably involves the manual use of hand blowers and/or hand rakes. Workers either walk in from the ends of a windrow carrying a hand blower and blow the nuts towards the middle of the windrow, or manually rake the nuts towards the center of the windrow, which is a slow process involving significant labor costs. Moving the nuts with a hand blower also makes precise placement of the nuts difficult. Without careful control some nuts may be missed by the harvester, affecting yields. Hand raking of the nuts is even more time-consuming and labor intensive than hand blowing the nuts from the windrow ends inward.

The nuts at the ends of the windows that are brought in conventionally, by either a hand blower or raking, are typically brought in as short of a distance as possible, in order to minimize the labor involved in shortening the windrow. As a result, typically, there is a heavy concentration of nuts at or near the ends of the shortened length of the windrow. The heavy concentration of nuts may not all be picked up by the harvester machine in one pass, and the machine may have to back up and drive over the ends of the shortened windrows again, in order to ensure that all nuts are collected. The additional time to back up and drive over the ends of the windrows shortened by a conventional method of moving the ends of the windrows inward adds significant cost to the process of harvesting the nuts.

Accordingly, it is desirable to provide an apparatus and methodology which overcomes these limitations. To this end, it should be noted that the above-described deficiencies are merely intended to provide an overview of some of the problems of conventional systems, and are not intended to be exhaustive. Other problems with the current state of the art and corresponding benefits of some of the various non-limiting embodiments may become further apparent upon review of the following description of the invention.

SUMMARY OF THE INVENTION

Embodiments of the present invention related to apparatuses and methods for efficiently and effectively sweeping fruit and/or nuts from windrow ends inward after the fruit or nuts have been shaken from trees, so as to facilitate removal by harvesting equipment.

In one embodiment, the invention relates to an apparatus for moving the ends of windrows inward, the apparatus comprising: (a) a front end, a rear end, and two opposing sides, the front end having a width greater than the width of the rear end, (b) two skids attached to the two opposing sides; (c) a gate operably attached to the rear end; and (d) a gate cylinder having a mounting end and a rod end, the gate cylinder operably attached to the gate at the rod end and configured to open and close the gate, wherein the apparatus is configured to funnel a wide row of nuts and/or fruit at the front end into a narrow row at the rear end. In some embodiments, the apparatus also comprises one or more arms (most typically, hydraulically operated arms) for raising the apparatus up and/or away from the ground so that the apparatus (1) may travel freely out of a windrow after nuts are dispersed, (2) may travel freely forward along a windrow to the other end so as to then move the other end of the windrow inward, and/or to move in and out of storage.

In some embodiments, the gate cylindered is located approximately at the midpoint between the two opposing sides, and a mounting end of the gate cylinder may be operably attached to a brace. In some embodiments, the apparatus also comprises diagonal braces fixedly attached to an upright member, which has been attached to a cross brace. The rod end of the gate cylinder may be operably attached to a gate linkage such that when the rod end of the gate cylinder is retracted, the gate moves to an open position, and when the rod end of the gate cylinder is extended, the gate moves to a closed position. In some embodiments, the gate may be rotatably attached to the rear end by a shaft and at least one bearing.

The invention also relates to a method for moving the ends of windrows inward, the method comprising (1) operably attaching an apparatus to a transport vehicle, the apparatus comprising (a) a front end, (b) a rear end, and (c) two opposing sides, the front end having a width greater than a width of the rear end, (d) two skids attached to the two opposing sides, (e) a gate operably attached to the rear end, and (f) a gate cylinder having a mounting end and a rod end, the gate cylinder operably attached to the gate at the rod end and configured to open and close the gate, and wherein the apparatus is configured to funnel a wide row of nuts and/or fruit at the front end into a narrow row at the rear end; (b) approaching a first end of a windrow with the gate in a lowered position; (c) moving the transport vehicle over the first end of the windrow; (d) contacting and pulling the nuts and/or fruit forward beneath the apparatus by continuing to move the transport vehicle forward; (e) operating a mechanism to lift the gate at a predetermined time and/or distance from the first end of the windrow, thereby allowing the nuts and/or fruit to disperse ratably while continuing to move the transport vehicle and the apparatus forward.

Embodiments of the present invention advantageously provide apparatuses and methods for moving the ends of windrows inward efficiently without the need to manually rake the ends of the windrows inward or blow the ends of the windrows inward with a hand blower, thereby saving a significant amount of time and costs. The present invention also advantageously distributes the nuts at the ends of the windrows more effectively over a greater distance in the windrow, thereby insuring that conventional harvesters will collect all of the nuts at the end of the windrows.

BRIEF DESCRIPTION OF THE DRAWINGS

Various non-limiting embodiments are further described with reference to the accompanying drawings in which:

FIG. 2A schematically illustrates a harvester turning into a windrow.

FIG. 2B schematically illustrates an exemplary windrow with ends brought in.

FIG. 3A schematically illustrates a windrow, an exemplary apparatus in accordance with an aspect of the subject specification and a transport vehicle, prior to the apparatus and transport vehicle moving over a first end of the windrow.

FIG. 3B schematically illustrates the exemplary apparatus of FIG. 3A after the apparatus has been moved over the first end of the windrow by the transport vehicle.

FIG. 5 is a plan view of an exemplary apparatus for moving windrow ends inward in accordance with an aspect of the subject specification.

FIG. 6 is a second view of an exemplary apparatus of FIG. 5 showing the apparatus connected to the back rail of a transport vehicle in accordance with an aspect of the subject specification.

FIG. 7A is a photograph of an exemplary apparatus for moving windrow ends inward viewed from the back of the apparatus and showing a gate in the lowered position and a cylinder for raising and lowering the gate in accordance with an aspect of the subject specification.

FIG. 8C is a photograph of the exemplary apparatus of FIG. 8A showing a partial view from the opposite side of the apparatus from that of the view of FIG. 8B.

DETAILED DESCRIPTION

Figure 1A:
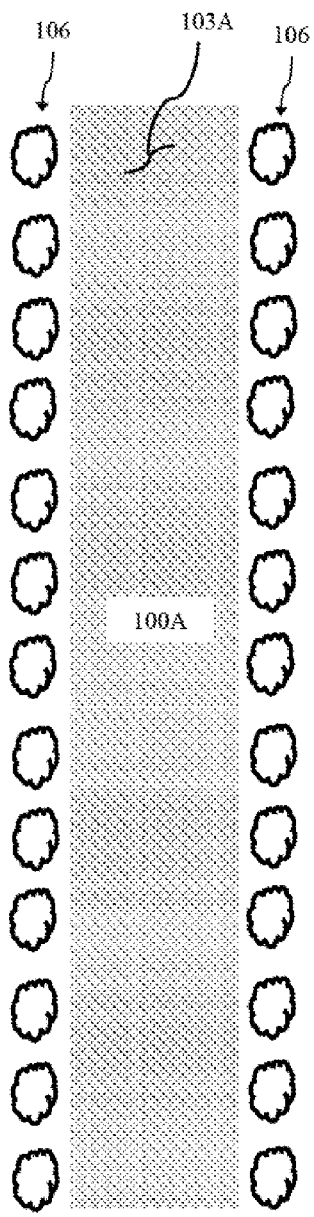
FIG. 1A schematically illustrates a scattering of nuts between rows of trees.
Figure 1B:
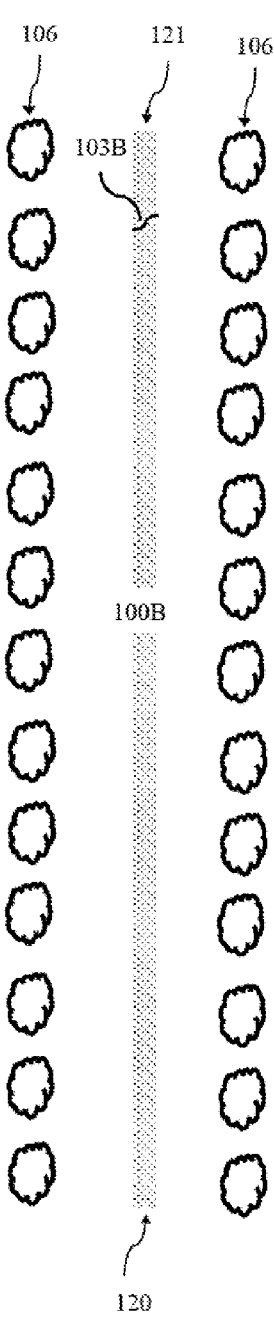
FIG. 1B schematically illustrates an exemplary windrow formed from the scattering nuts illustrated in FIG. 1A.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications, and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures and components have not been described in detail so as not to unnecessarily obscure aspects of the present invention.

For the sake of convenience and simplicity, the terms "funnel-like apparatus," "funnel-like trailer apparatus," "trailer apparatus," and "apparatus" may be used interchangeably herein, but are generally given their art-recognized meanings. Also, for convenience and simplicity, the terms "cylinder," "hydraulic cylinder," and "hydraulic ram," may be used interchangeably, and wherever one such term is used, it also encompasses the other terms.

As discussed in the background, conventional methods for moving windrow ends inward often involve walking between the rows of trees near the windrow ends carrying a hand blower, and blowing the nuts towards the middle of the windrow, or manually raking the nuts toward the middle of the windrow. The various embodiments disclosed herein are directed to increasing the speed and efficiency at which nuts can be moved inward from the ends of windrows, and decreasing the amount of labor required to move the nuts, so that the nuts may be harvested with a harvester more efficiently and cost-effectively.

Exemplary Methods for Moving the Ends of Windrows Inward

In an exemplary embodiment, a funnel-like trailer apparatus for moving the nuts in a windrow inward is disclosed. FIGS. 3A-3B illustrate an exemplary sequence of steps that facilitates moving a first end 320A of a windrow 300A inward with the apparatus 311 and transport vehicle 312. The nuts 303 had previously been shaken from the rows of trees 306 and swept into windrow 300A by conventional methods. As illustrated, the funnel-like apparatus 311 is configured to be attached to a transport vehicle 312 (e.g., a tractor, an all-terrain vehicle, a utility vehicle, etc.) at the front (wider) end of apparatus 311. At the first step (FIG. 3A), the transport vehicle 312 with the attached funnel-like apparatus 311 approaches the first end 320A of a windrow 300A. At the second step (FIG. 3B), the vehicle 312 and apparatus 311 have moved inward, wherein the first end 320A of windrow 300A remains intact beneath the vehicle 312 and apparatus 311. When the vehicle 312 and apparatus 311 have driven over the first end 320A of windrow 300A, a gate (not shown; see e.g., gate 755 of FIG. 7A) in a closed position at and/or near the rear end (not shown; see e.g., rear end 752 of FIG. 7A) of the apparatus 311 makes the first contact with the first end 320A windrow 300A. As the vehicle 312 continues to move forward, the gate of the funnel-like apparatus 311 pulls the nuts 303 along, collecting the nuts 303 beneath the apparatus 311.

Figure 3C:
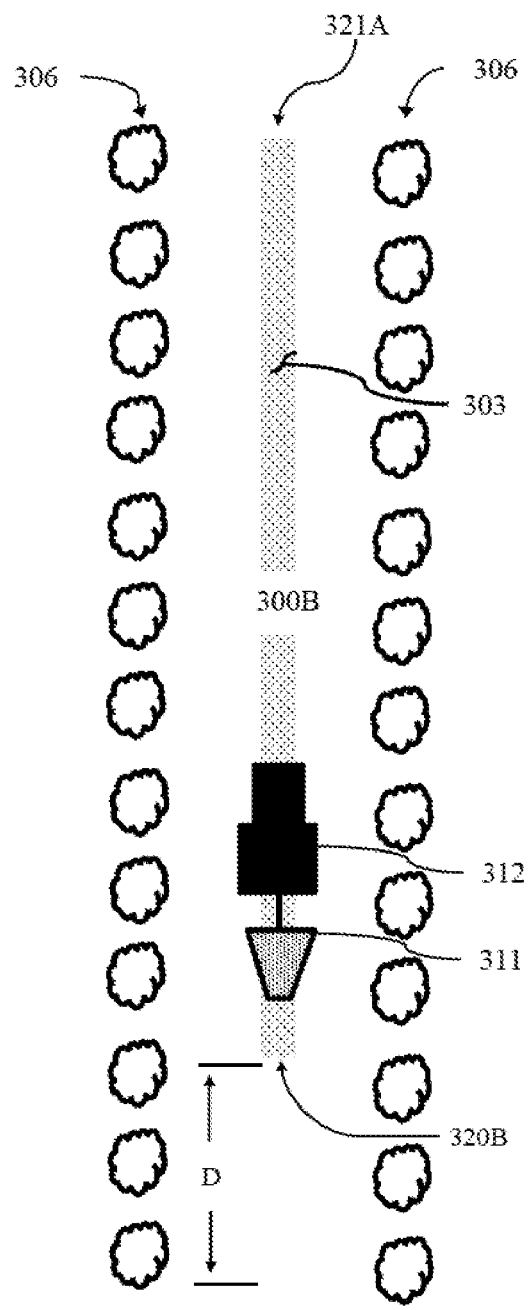
FIG. 3C shows the windrow of FIG. 3A after the first end has been brought inward by the exemplary apparatus of FIG. 3A and the transport vehicle.

As shown in FIG. 3C, at a prescribed and/or predetermined distance D from what was the first end 320A of the windrow 300A, the operator of the transport vehicle 312 operates a lever or other conventional mechanism (not shown) on the vehicle 312 to open the gate of the apparatus 311, allowing the accumulated nuts 303 to be dispersed and/or distributed ratably beginning at the repositioned first end 320B of the shortened windrow 300B as the transport vehicle 312 and apparatus 311 continue to move forward. The operator may then move the transport vehicle 312 and the apparatus 311 backwards out of the shortened windrow 300B to a first end of the next adjacent windrow (not shown) to repeat the process. In other embodiments the operator may move the transport vehicle 312 and the apparatus 311 forward to the second (opposite) end 321A of the shortened windrow 300B to move the second end 321A of the shortened windrow 300B inward.

In some embodiments the operator of the transport vehicle 312 may move the vehicle 312 and the apparatus 311 forward to the second end 321A of shortened windrow 300B, but instead of moving the second end 321A of shortened windrow 300B inward, the operator may continue out of the shortened windrow 300B to the second end of the adjacent windrow to move the second end of the adjacent windrow inward. In such embodiments, the operator may proceed through the rows of tree in the field or orchard in a serpentine pattern, and then proceed back through the field or orchard in a reverse serpentine pattern moving the ends opposite to the ends previously moved inward.

Figure 4A:
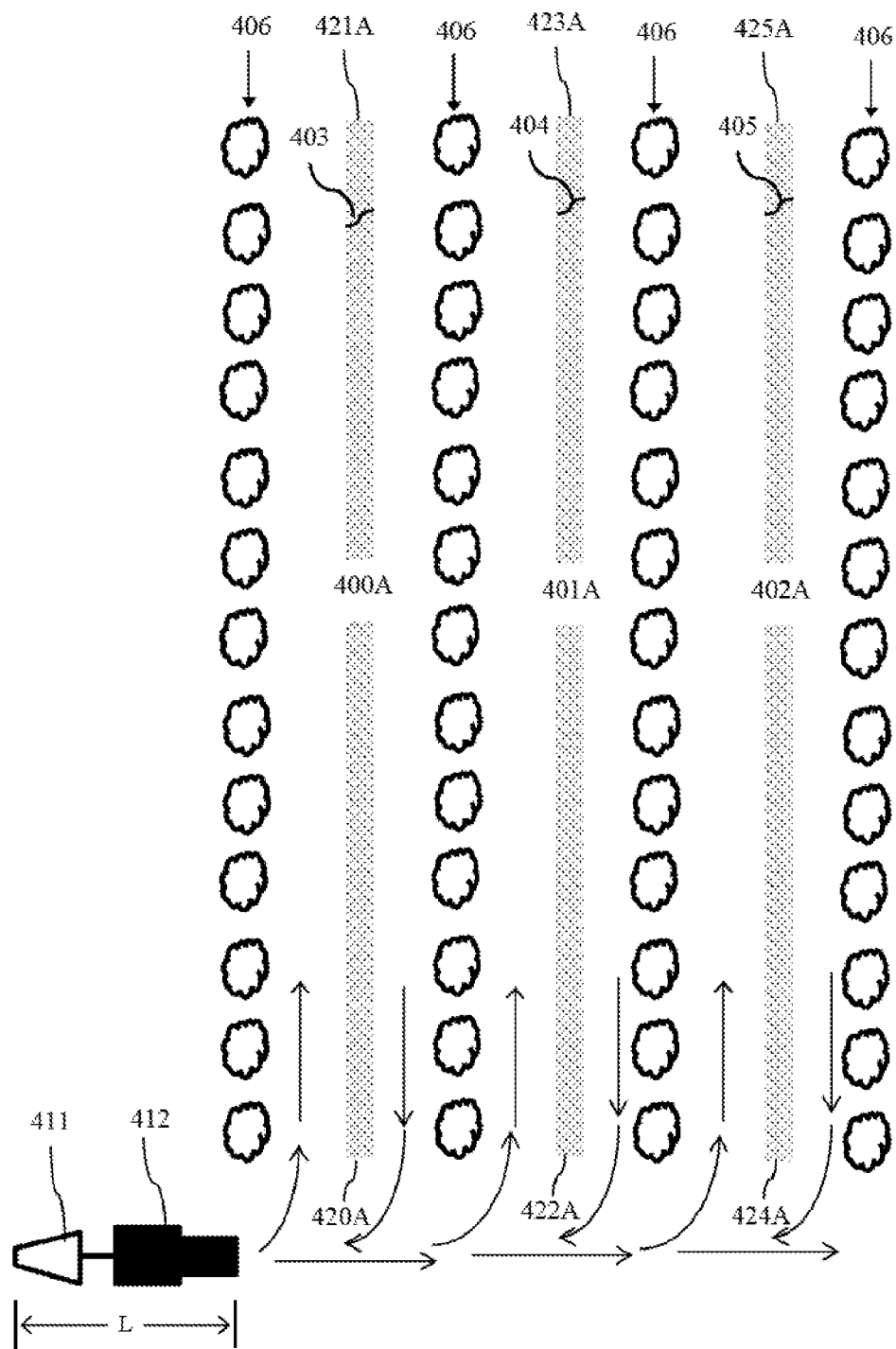
FIG. 4A schematically illustrates exemplary windrows before they are brought inwards with an apparatus in accordance with an aspect of the subject specification.
Figure 4B:
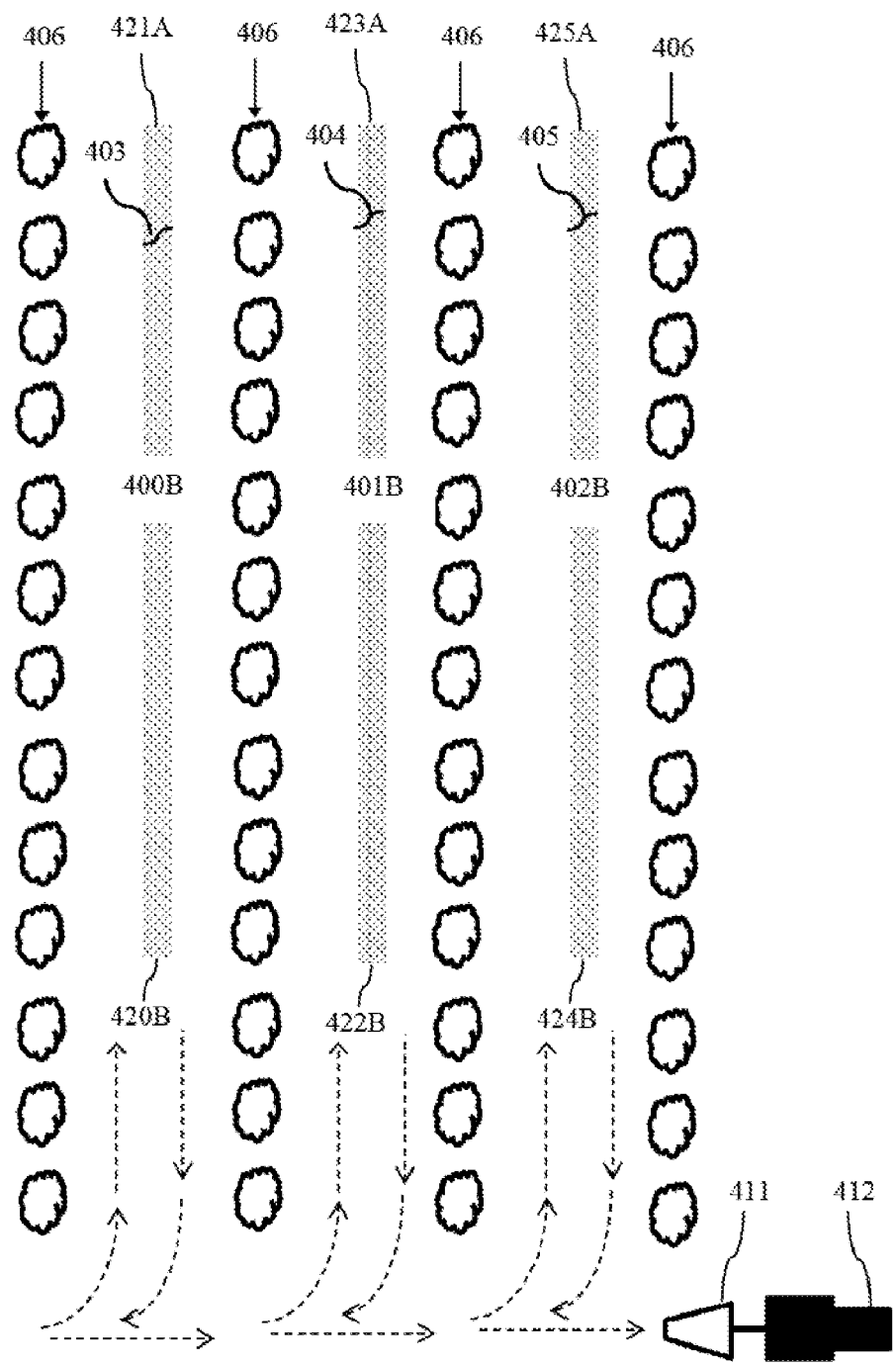
FIG. 4B schematically illustrates exemplary windrows after they are brought inwards with an apparatus in accordance with an aspect of the subject specification.

FIGS. 4A-4B, respectively, illustrate exemplary windrows before and after the ends are brought inwards with an apparatus in accordance with an embodiment of the present invention. In FIG. 4A is shown three windrows, 400A, 401A and 402A containing nuts 403, 404 and 405 which had previously been shaken from rows of trees 406 and swept into the windrows 400A-402A by conventional means. The travel of a transport vehicle 412 and trailer apparatus 411 are shown schematically. Typically, the transport vehicle 412 and apparatus 411 will enter the first windrow 400A and travel over the first end 420A of windrow 400A until it collects the nuts 403 from at least a distance D (see e.g., distance D in FIGS. 2B and 3C) equal to or greater than the combined length L of the transport vehicle 412 and apparatus 411. The transport vehicle 412 and apparatus 411 will continue to travel forward into the windrow 400A until the apparatus 411 distributes the nuts 403 collected from at least the distance D.

Typically, after distributing the nuts 403 from the first end 420A of windrow 400A, the transport vehicle 412 and apparatus 411 reverse the direction of travel and back out of the first windrow 400A. The steps will then be repeated for the first end 422A of the second windrow 401A, collecting and distributing nuts 404, and the first end 424A of the third windrow 402A, collecting and distributing nuts 405. FIG. 4B shows shortened windrows 400B-402B and the repositioned ends 420B, 422B and 424B. Although FIGS. 4A and 4B show three parallel windrows, a field or orchard may have any number of windrows. Once all windrows are brought in, a harvester may then effectively pick up the nuts and drop them into the accompanying nut trailer.

Although not shown in FIGS. 4A-4B, the transport vehicle 412 and apparatus 411 may also bring the second ends, respectively 421A, 423A, and 425A inward at least a distance D equal to the length L of transport vehicle 412 and apparatus 411. The second ends 421A, 423A and 425A may be brought inward after all of the first ends 420A, 422A and 424A are brought inward. Alternatively, the transport vehicle 412 and apparatus 411 may travel in a serpentine pattern. Specifically, the sequence of bringing the ends or windrows inward may be as follows: (1) first end 420A of windrow 400A may be brought inward, (2) second end 423A of windrow 401A may be brought inward, and (3) first end 424A of windrow 402A is brought inward. The serpentine pattern may then be reversed such that (4) the second end 425A of windrow 402A is brought inward, (5) the first end 422A of windrow 401A is brought inward, and (6) the second end 421A of windrow 400A may be brought inward.

Exemplary Apparatuses for Moving the Ends of Windrows Inward

FIG. 5 shows a top view of an exemplary funnel-like apparatus 511 according to an embodiment of the invention. The apparatus 511 comprises a front end 551 and a rear end 552, the front end having a width greater than a width of the rear end, two opposing sides 553A-B, attached to the front end and the rear end, each of the two opposing sides having an attached skid 554A-B. The apparatus 511 also comprises a gate 555, a gate cylinder (e.g., a hydraulic ram) 556, associated tubing (not shown; see e.g., hydraulic tubing 658 of FIG. 6), and a gate linkage 557. In some embodiments a backup rake 559 may be attached to the rear end 552, configured to rake nuts that may be missed by the funnel-like apparatus 511. The apparatus 511, when viewed from the top comprises a trapezoidal shape such that the front end 551 is configured to be wider than the rear end 552. Thus, as the apparatus 511 travels from an end toward the middle of a windrow, a wide row of nuts at the front end 551 is funneled to a narrower row of nuts at the rear end 552.

In some embodiments, the front end 551, rear end 552, opposing sides 553A-B, skids 554A-B and the gate 555 may comprise metal, for example, steel sheet and/or steel plate, which may be rolled, formed and/or bent. In some embodiments the two skids 554A-B may comprise steel bars, steel channel, and/or steel angles. The apparatus 511 may also comprise square and/or rectangular steel tubing. In other embodiments the apparatus 511 may comprise aluminum and/or an aluminum alloy, stainless steel, fiberglass reinforced plastic, and/or other plastic materials that may be bent, formed, drilled and/or screwed. The apparatus 511 may be welded, brazed, bolted, riveted, fused and/or screwed together. The metal may be prime painted, finished painted, anodized, electro-plated and/or otherwise treated and/or coated by other conventional methods so as to prevent rust, corrosion and/or to extend the useful life of the apparatus 511. In some embodiments, the undersides (i.e., the sides that contact the ground) of skids 554A-B may be coated (e.g., with a Teflon coating, electroless nickel PTFE coating, hard chrome coating, etc.) to reduce friction and improve wear. The apparatus 511 may also have attached two or more wheels (not shown) to assist in moving the apparatus 511 in and/or out of the windrows (e.g., windrows 400A-402A of FIG. 4) when in use.

In some embodiments the gate cylinder 556 may be pneumatically operated by a compressor/pneumatic control system in the transport vehicle. In other embodiments, the gate cylinder 556 may be hydraulically operated, again through the use of a hydraulic system/control system on the transport vehicle. Other methods known in the art may also be used to raise and lower the gate (e.g., a motor, servo-motor, chain drive, belt drive, etc.). In some embodiments, the gate cylinder 556 (or other conventional device for opening or closing the gate) may be operated from the transport vehicle via a lever, switch, push button and/or other conventional method of operation.

Referring now to FIG. 6, the funnel-like trailer apparatus 611 is shown connected to a rear end of a transport vehicle by three arms (e.g., hydraulic arms). Specifically, a center arm 660, and secondary 661A-B are connected to the rear end of a transport vehicle. When the center arm 660 and secondary arms 661A-B are activated (e.g., by a lever and/or switch in a transport vehicle), the funnel-like apparatus 611 is raised up and away from the ground (i.e., the skids 654A-B, gate 655 and/or wheels do not contact the ground) so that the apparatus 611 may be moved in and/or out of the windrows freely after the nuts are dispersed, or may be moved in or out of storage, before and/or after use. When the center arm 660 and secondary arms 661A-B are deactivated, the apparatus 611 is lowered such that skids 654A-B and gate 655 contact the ground and the apparatus may start to collect nuts.

In the embodiment of FIG. 6, hydraulic tubing 658 connects a hydraulic cylinder (hydraulic ram) 656 to a transport vehicle hydraulic control system. However, and as described above, in other embodiments, the cylinder 656 may be pneumatically operated, or the gate 655 may be opened and closed by some other method known in the art (for example a motor, servo-motor, etc.) and such motor or servo-motor may be electrically connected to a control system located on or in the transport vehicle.

Referring now to the photographs of FIGS. 7A-7D, there is shown an exemplary rear view (FIG. 7A), an exemplary left side view (FIG. 7B), an exemplary right side view (FIG. 7C) and a second exemplary rear view (FIG. 7D), respectively, of an exemplary funnel-like apparatus 711 used to move windrow ends inward. In FIGS. 7A-7D the apparatus 711 is attached to a transport vehicle. The apparatus 711 comprises a front end 751 (see FIGS. 7B and 7C) and a rear end 752 having an opening (not shown), the front end having a width greater than a width of the rear end, two opposing sides 753A-B attached to front end 751 and the rear end 752, each of the two opposing sides 753A-B having an attached skid 754A or 754B, a gate 755 operably attached to the rear end and configured to cover the opening in the rear end, a gate cylinder 756 operably attached to the gate and configured to close the gate to collect fruit and/or nuts within the apparatus, and open the gate to distribute the fruit and/or nuts outside of the apparatus. As shown in FIGS. 7A-7D, the apparatus 711 also comprises a gate linkage 757, tubing 758, arms 760 (see FIG. 7B) and 761A-B, and wheels 762A-B.

Figure 7B:
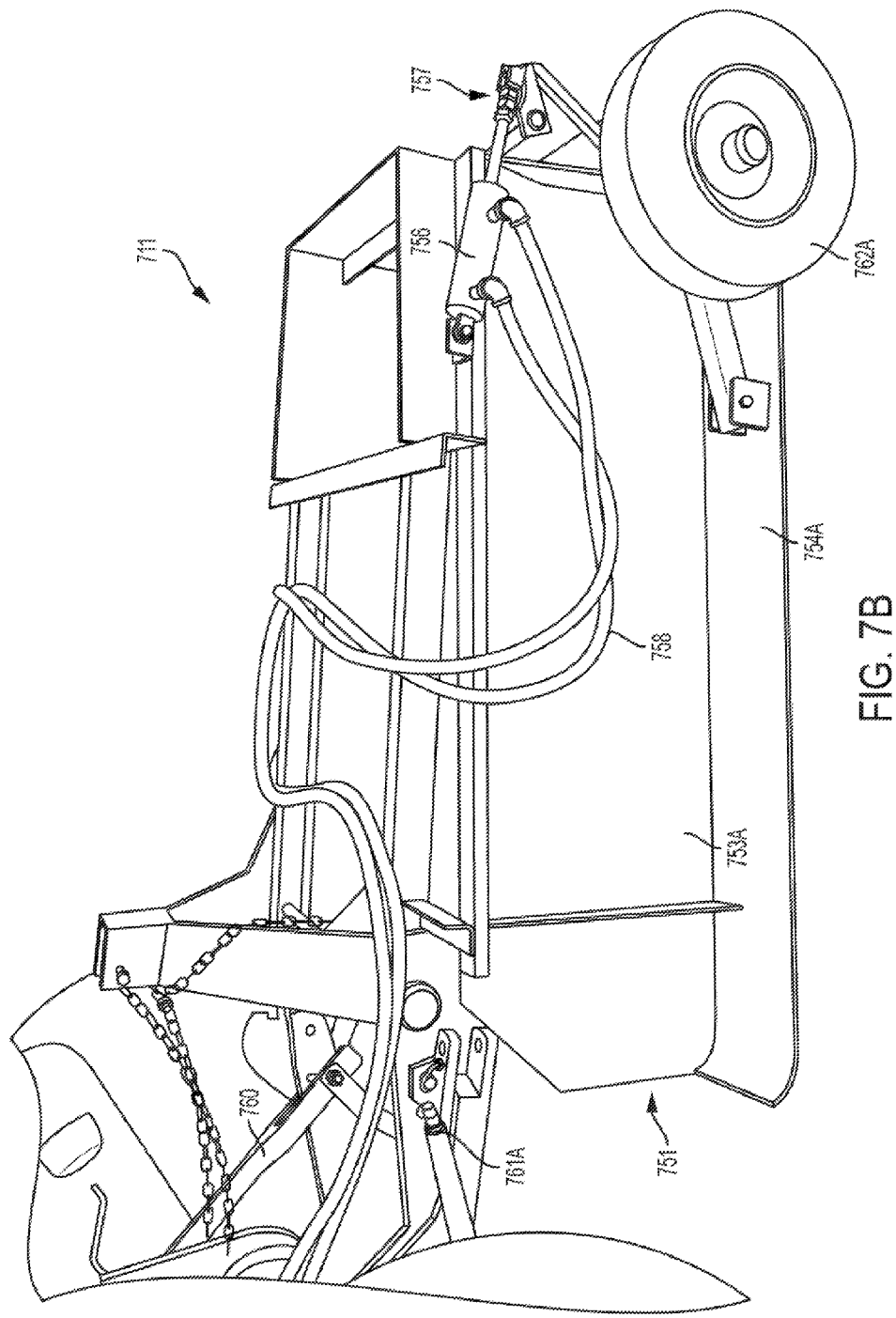
FIG. 7B is a second photograph of the exemplary apparatus of FIG. 7 viewed from the cylinder side of the apparatus in accordance with an aspect of the subject specification.
Figure 7C:
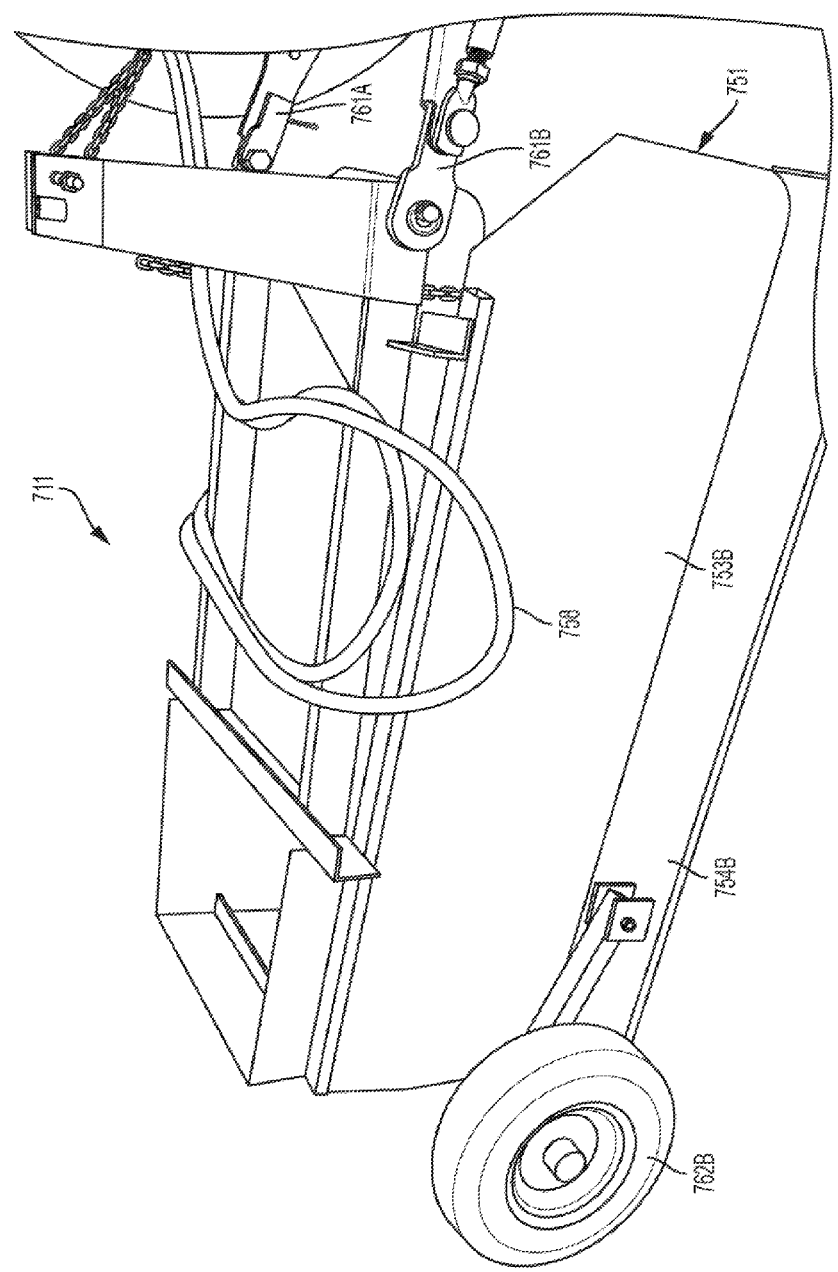
FIG. 7C is a third photograph of the exemplary apparatus of FIG. 7 viewed from the side opposite the cylinder side of the apparatus in accordance with an aspect of the subject specification.
Figure 7D:
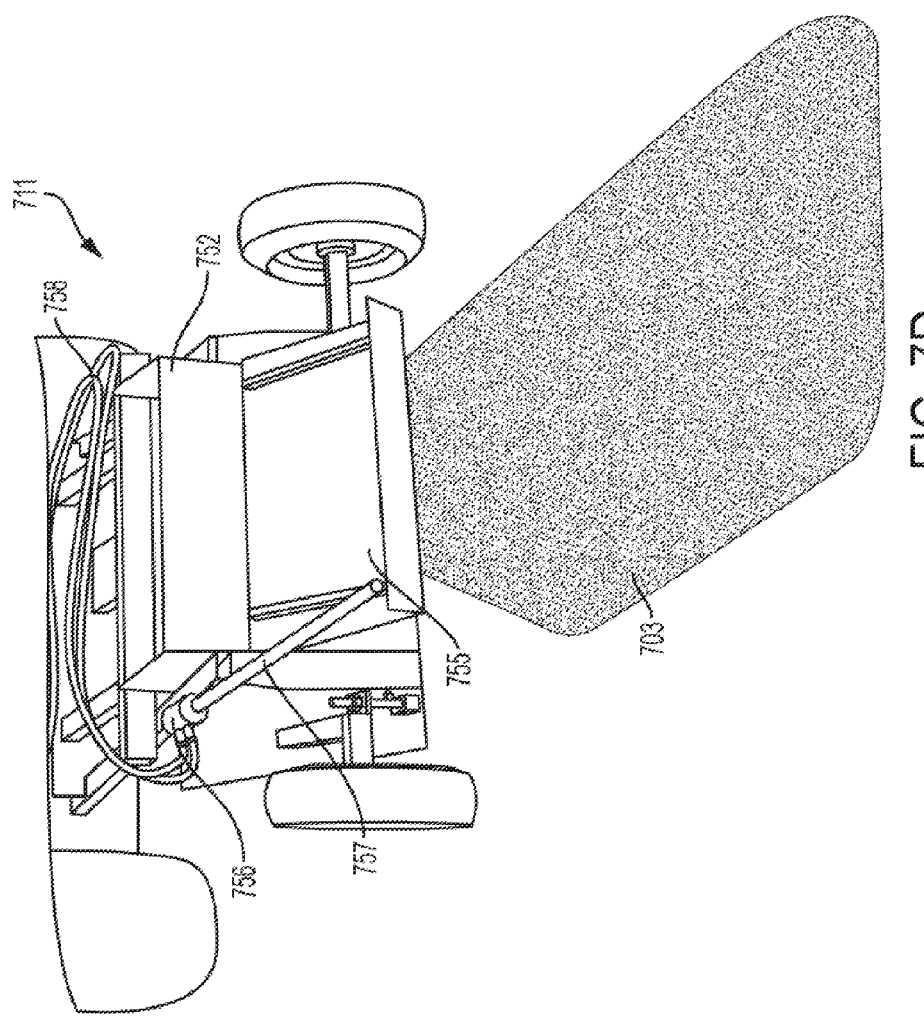
FIG. 7D is a photograph of the exemplary apparatus of FIG. 7 moments after the gate has been lifted as the apparatus is pulled forward in accordance with an aspect of the subject specification.

In the embodiment of FIGS. 7A-7 D, the gate cylinder 756 is operated hydraulically by a hydraulic control system (not shown) on the transport vehicle, and the tubing 758 is hydraulic tubing. The arms 760, 761A-B may also be hydraulically operated by a hydraulic control on the transport vehicle, wherein the arms 760, 761A-B are utilized for raising and lowering the apparatus 711 on and/or off the ground when not in use, or when backing out of or moving forward in a windrow. The views of FIGS. 7A-7D show the apparatus 711 in a lowered position, ready to collect nuts at the ends of the windrows, or as shown in FIG. 7D, in the process of distributing nuts in a windrow.

Also in the embodiment of FIGS. 7A-D, the gate cylinder 756 is located on one of the opposing sides 753A-B (i.e., opposing side 753A) of the apparatus 711. However, in other embodiments, the gate cylinder 756 may be located on the other opposing side (i.e., 753B), or may be centered between the two opposing sides 753A-B of the apparatus 711 and supported by an optional brace (not shown, see e.g., cylinder 856 and brace 881 of FIG. 8B). In some embodiments two or more gate cylinders 756 may be used to operate gate 755, and one of the two or more gate cylinders 756 may be located on each of the two opposing side 753A-B of apparatus 711. Similarly, two or more gate linkages 757 may connect gate 755 to the two or more gate cylinders 756, and the two or more gate linkages 757 may be fixedly attached to each other so that the gate cylinders 756 operate in unison.

Further, in the embodiment of FIGS. 7A-7D, the gate 755 is rotatably attached to the rear end 752 by hinges 763. The hinges 763 may be welded, brazed, bolted, screwed and/or riveted to the rear end 752, so that gate 755 may be opened and/or closed by gate cylinder 756 and gate linkage 757. However, in other embodiments, a shaft and bearings may be used to rotatably attach the gate 755 to the rear end 752 (see, e.g., gate 755, bearings 872A-B, and rear end 852 of FIG. 8A).

In FIG. 7D, the exemplary apparatus 711 of FIG. 7A-7C is illustrated just as the gate 755 begins to open, while the apparatus 711 is being pulled forward by a transport vehicle. Specifically, as the apparatus 711 moves forward, nuts 703 that have accumulated within the apparatus 711 are released from an opening (not shown; see for example, semicircular opening 1095 of FIG. 10) in the rear end 752 of the apparatus 711 via the opened gate 755. Because the apparatus 711 continues to move forward as the gate 755 is opened, the nuts 703 are ratably distributed along a windrow.

Figure 8A:
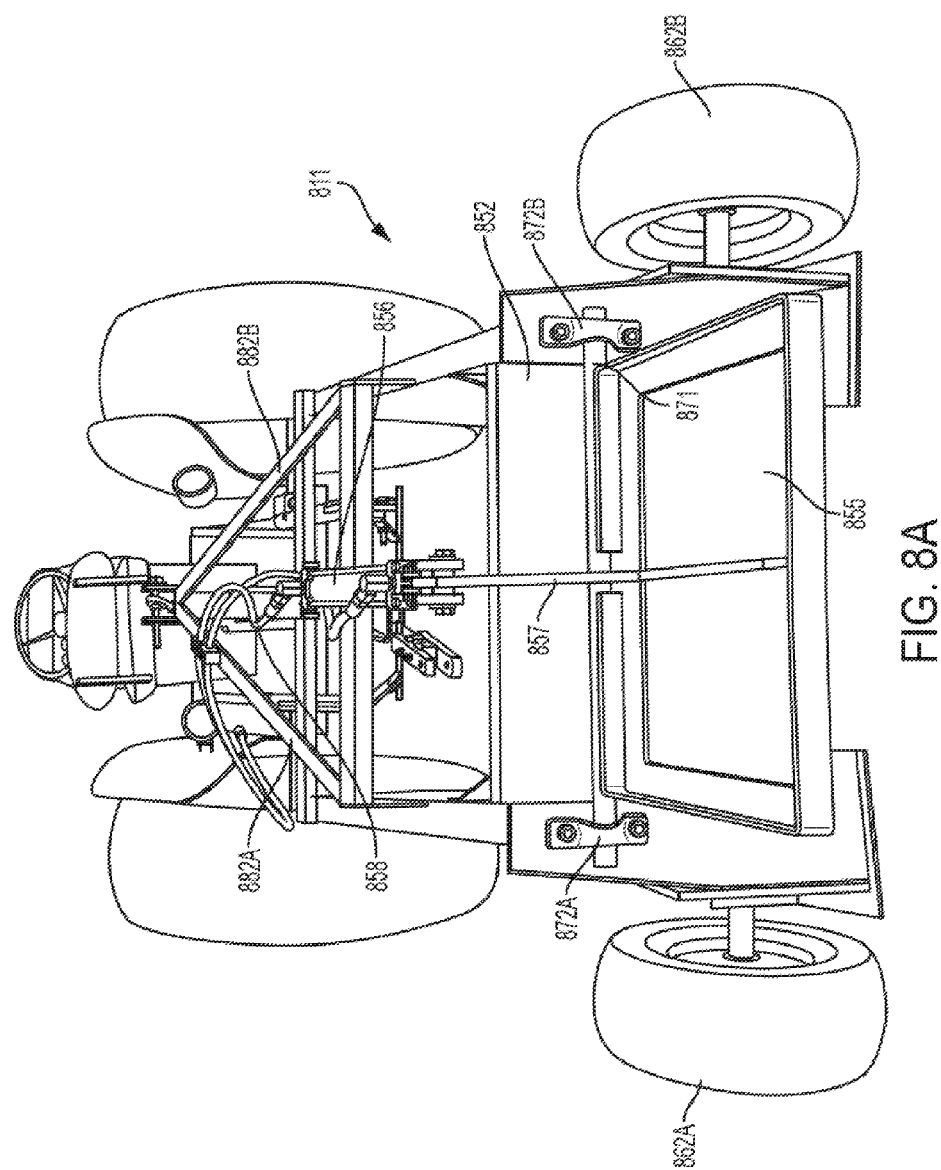
FIG. 8A is a photograph of a second exemplary apparatus for moving windrow ends inward viewed from the rear end of the apparatus and showing the apparatus attached to a transport vehicle and a gate of the apparatus in the open position.
Figure 8B:
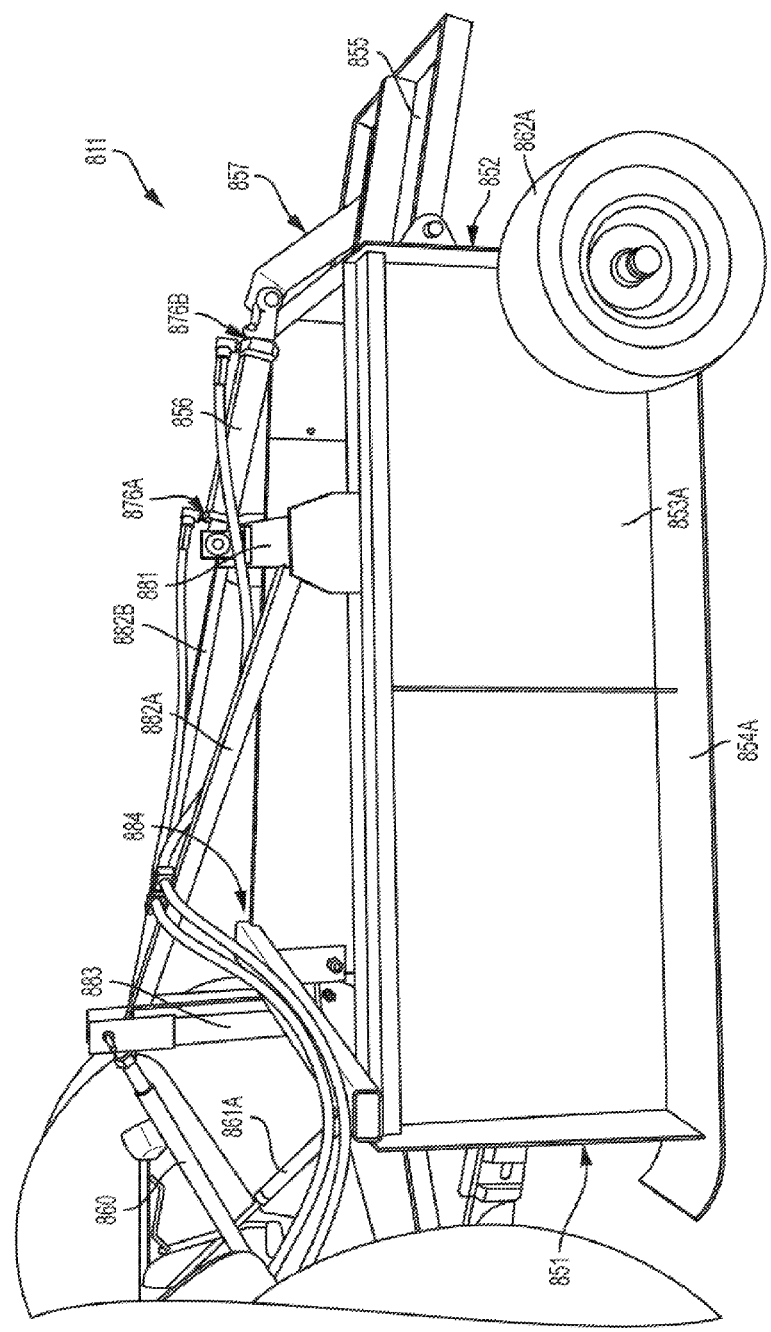
FIG. 8B is a photograph of the exemplary apparatus of FIG. 8A viewed from the side of the apparatus in accordance with an aspect of the subject specification.

Referring now to FIGS. 8A-8C, therein is shown an exemplary apparatus 811 according to an embodiment of the present invention comprising a front end 851 and a rear end 852, the front end having a width greater than a width of the rear end, two opposing sides 853A-B attached to the front end and the rear end, each of the two opposing sides 853A-B having an attached skid 854A or 854B, a gate 855 operably attached to the rear end 852 and configured to cover an opening (not shown; see, e.g., semicircular opening 1095 of FIG. 10) in the rear end 852, a gate cylinder 856 operably attached to the gate and configured to close the gate to collect fruit and/or nuts within the apparatus, and open the gate to distribute the fruit and/or nuts outside of the apparatus.

As shown in FIGS. 8A-8C, the apparatus 811 also comprises a gate linkage 857 operably attached to the gate cylinder 856, tubing 858, center arm 860, two secondary arms 861A-B, wheels 862A-B, a brace 881, two diagonal braces 882A-B, upright member 883 and a cross brace 884. The front end 851, opposing sides 853A-B, rear end 852, and skids 854A-B may be attached or otherwise connected by welding, brazing, bolting, screwing and/or riveting. In the embodiments of FIGS. 8A-8C, the gate cylinder 856 is located at approximately the midpoint between opposing sides 853A-B, and a mounting end 876A of gate cylinder 856 may be operably attached to a brace 881 by conventional means (e.g., with steel angles, channel, and/or plate, and/or with bushings, bolts and nuts, washers, lock washers, locking pins, etc.). Brace 881 may be fixedly attached to opposing sides 853A-B by welding, brazing, bolting, screwing and/or riveting.

In addition, the apparatus 811 of FIGS. 8A-8C comprises diagonal braces 882A-B which may be fixedly attached to each other at and/or near front end 851 and to brace 881 by welding, brazing, bolting, screwing and/or riveting. In the embodiment of FIGS. 8A-C, diagonal braces 882A-B are also fixedly attached to an upright member 883, and the upright member 883 may be fixedly attached to a cross brace 884 at approximately the midpoint. The cross brace 884 may be also be fixedly attached to the opposing sides 853A-B. Such fixed connections may be made by welding, brazing, bolting, screwing and/or riveting. Although the embodiment of FIGS. 8A-8C comprises diagonal braces 882A-B, in other embodiments, other configurations of braces may be used to add strength and rigidity to the apparatus 811. For example, in some embodiments, additional cross braces attached to and spanning between the opposing sides may be utilized, and/or longitudinal braces attached to the front end, the rear end, and/or one or more cross braces may be used. Further, in some embodiments, longitudinal braces may be attached to one or more upright members.

Figure 8D:
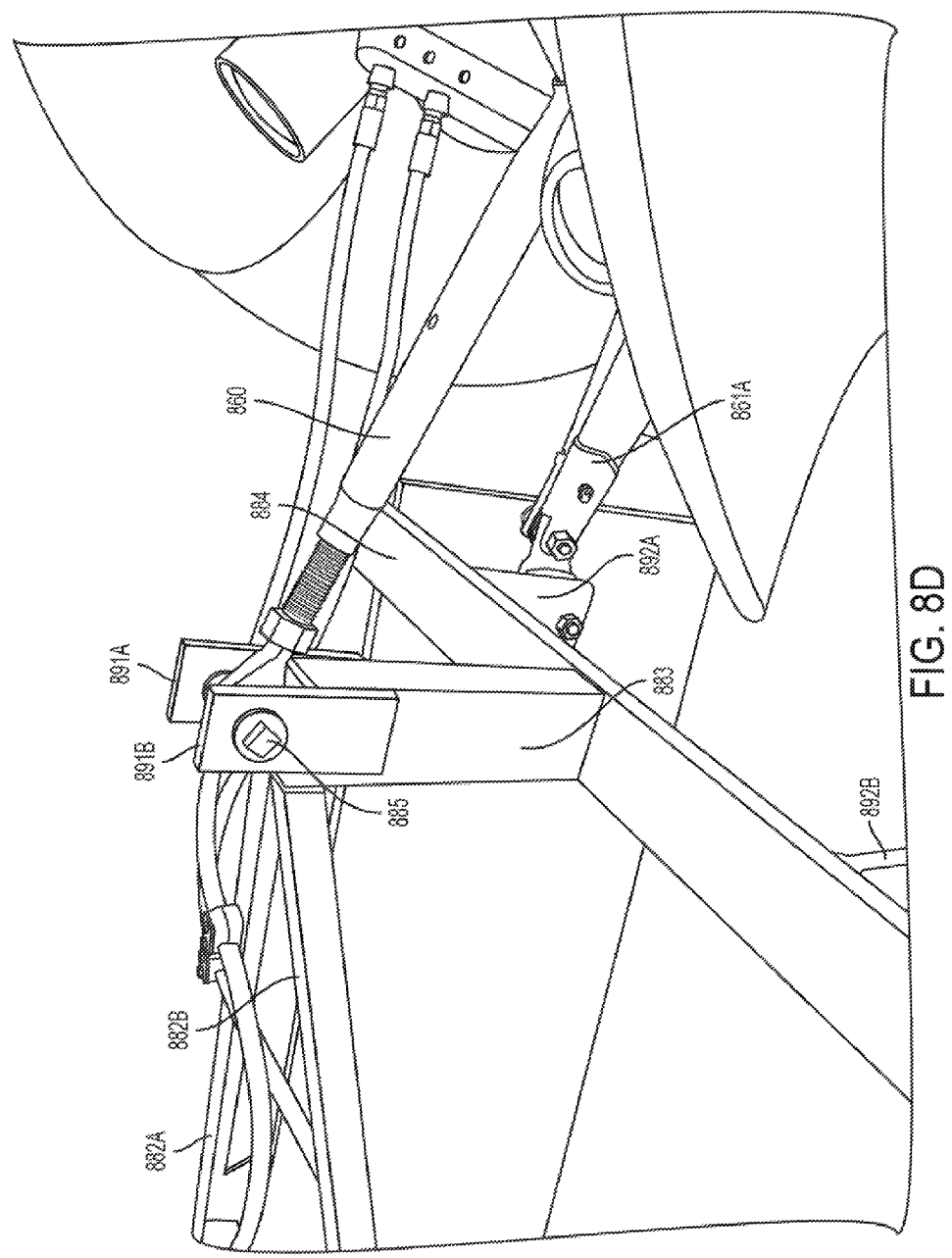
FIG. 8D is a photograph of the exemplary apparatus of FIG. 8A showing connection of a center rod of a transport vehicle to an upright member.
Figure 8E:
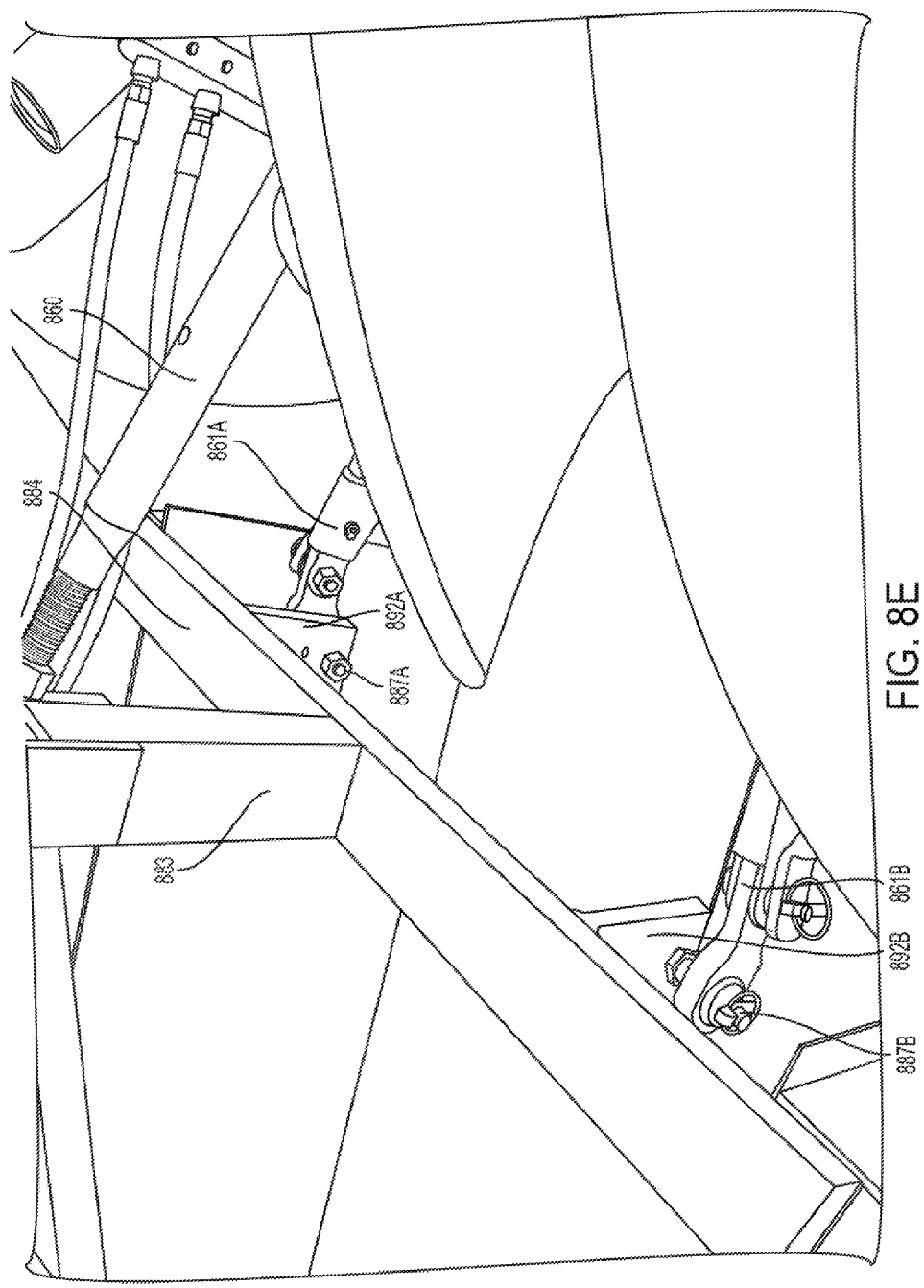
FIG. 8E is an enlarged photograph of the exemplary apparatus of FIG. 8A showing connection of the side rods of the transport vehicle to a cross brace attached to the opposing sides of the apparatus.
Figure 9:
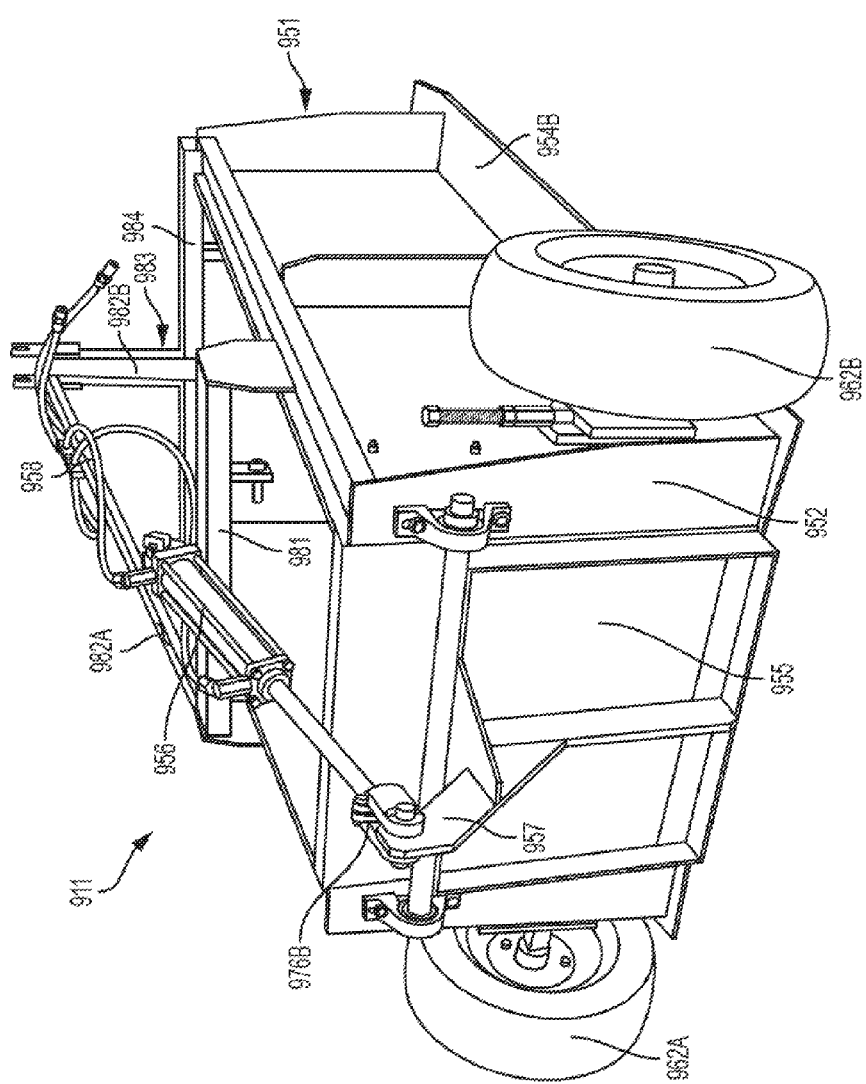
FIG. 9 is a photograph of an exemplary apparatus viewed from the rear end and side of the apparatus showing a gate of the apparatus in the closed position.

The rod end 876B of gate cylinder 856 may be operably attached to gate linkage 856 as shown in FIG. 8B (see also rod end 976B attached to gate linkage 957 of FIG. 9). To open the gate 855, the gate cylinder 856 is operated (e.g., by a hydraulic control system on a transport vehicle) such that the rod end 876B is retracted (see FIGS. 8A-8B), and the gate linkage 856 pulls gate 855 open. To close the gate 855, the gate cylinder 856 is operated such that the rod end 876B is extended (see, e.g., rod end 976B and FIG. 9) and gate linkage 856 pushes gate 855 closed. In the embodiment of FIGS. 8A-E, hydraulic tubing 858 connects the hydraulic gate cylinder (hydraulic ram) 856 to the transport vehicle hydraulic control system (not shown). However, and as described above, in other embodiments, the cylinder 856 may be pneumatically operated, or the gate 855 may be opened and closed by some other method known in the art (for example a motor, servo-motor, etc.) and such motor or servo-motor may be electrically connected to a control system located on or in the transport vehicle.

In some embodiments, the gate 855 may be rotatably attached to the rear end 852 by shaft 871 and bearings 872A-B. Although the embodiment of FIG. 8A-8E has two bearings 872A-B, other embodiments may have as few a one (1) bearing or as many as five (5) bearings (e.g., 1, 3, 4, etc.). The bearings 872A-B may be pillow block bearings or any other type of conventional bearing that may be utilized to attach the shaft 871 to the rear end 852 of the apparatus 811.

Referring now to FIG. 8D-8E, therein are shown enlarged views of the center arm 860 and the two secondary arms 861A-B of the apparatus of FIGS. 8A-8C. In the embodiment shown in FIGS. 8A-C, the upright member 883 also comprises two plates 891A-B for connection of the center arm 860, and the center arm 860 may be operably attached to the two flat plates 891A-B by removable bolt 885. In some embodiments, the center arm 860 may also comprise one or more bearings and or bushings (not shown) that may be pressed into and/or otherwise attached to center arm 860. The cross brace 884 may also comprise two secondary plates 892A-B fixedly attached to cross brace 884 by welding, brazing, bolting, screwing and/or riveting. The secondary arms 861A-B may be attached to cross brace 884 and/or secondary plates 892A-B by secondary removable bolts 887A-B. When the apparatus 811 is not in use and/or is being stored, apparatus 811 may be disconnected from the transport vehicle by removal of removable bolt 885 and secondary removable bolts 887A-B. In such embodiments, the center arm 860 and secondary arms 861A-B remain attached to the transport vehicle.

Although the embodiment of FIGS. 8A-8C shows one center arm 860 and two secondary arms 861A-B, other arrangements of arms are possible. For example, in some embodiments, a single arm may raise and lower the apparatus 811 in relationship to the transport vehicle, while in other embodiments, there may be two parallel primary arms to raise and lower the apparatus 811. In various embodiments, as many as a total of six arms may be used for raising and lowering the apparatus 811 in relation to the transport vehicle.

In FIG. 9, is shown an exemplary apparatus 911 disconnected from a transport vehicle. Similar to apparatus 811 of FIGS. 8A-8C, the apparatus 911 comprises a front end 951, a rear end 952, two opposing sides 953A-B, skids 954A (not shown) and 954B, a gate 955, a gate cylinder 956, a gate linkage 957, tubing 958, wheels 962A-B, a brace 981, two diagonal braces 982A-B, upright member 983 and a cross brace 984. In the embodiment of FIG. 9, a rod end 976B of cylinder 956 is shown in the extended position with the gate 955 in the closed position. As is shown in FIG. 9, when apparatus 911 is not connected to a transport vehicle, arms (e.g., center arm 860 and secondary arms 861A-B of FIGS. 8D-8E) are not part of the apparatus 911. Also, as is shown in FIG. 9, the hydraulic lines 958, which connect the gate cylinder 956 to a hydraulic control system on the transport vehicle, remain with the apparatus 911.

Figure 10:
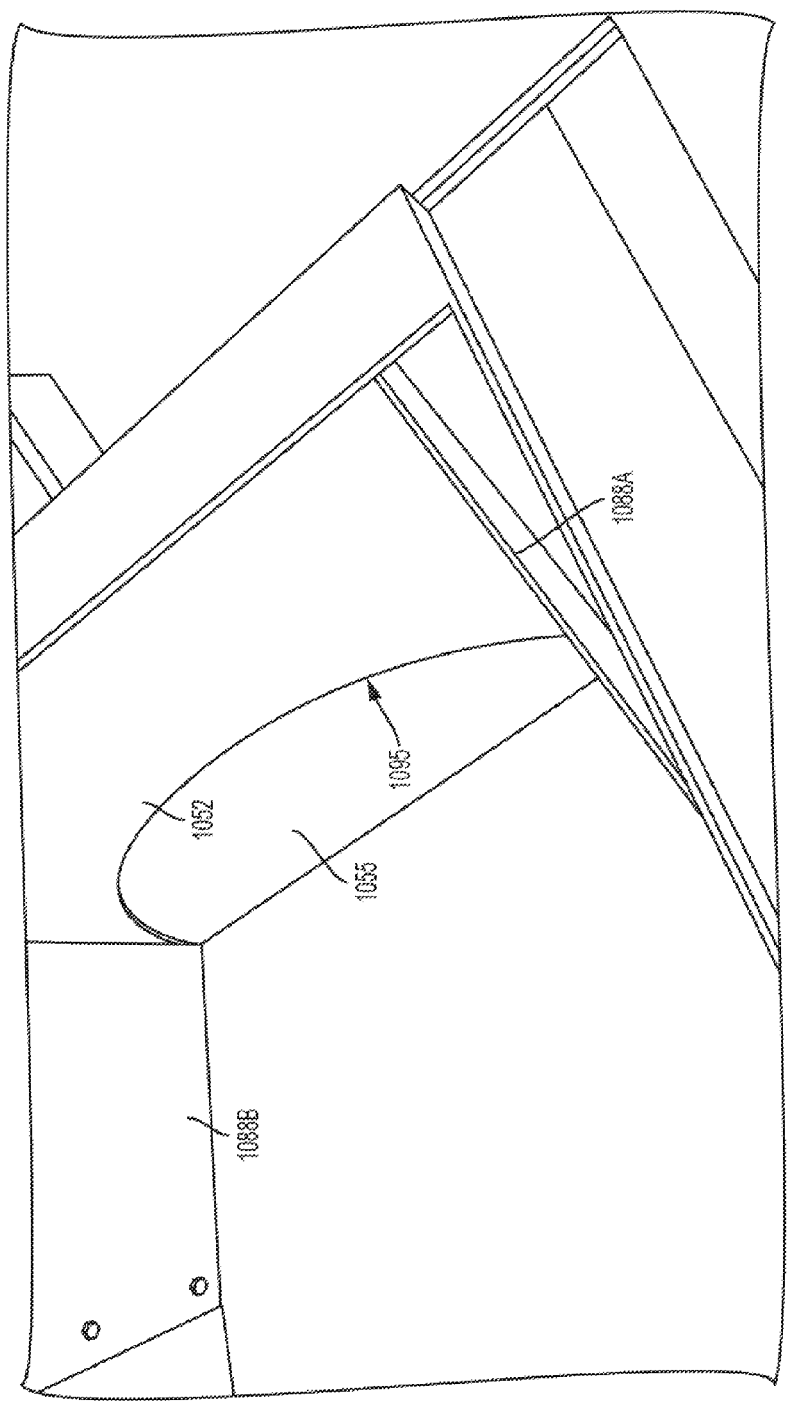
FIG. 10 is an enlarged photograph of an exemplary apparatus viewed from the top, near the rear end, showing a semicircular cutout in the rear end of the apparatus and two beveled guides attached to opposing sides of the apparatus.

Referring now to FIG. 10, therein is shown an enlarged view looking inside the rear end 1052 of an exemplary apparatus. In the embodiment of FIG. 10, the rear end 1052 comprises a semicircular opening 1095 configured to aid in the distribution of nuts when gate 1055 is in the open position. However, in some embodiments, the opening in the rear end may be triangular, square, rectangular, pentagonal, hexagonal, octagonal, elliptical, ovoid and/or an irregular shape. The embodiment of FIG. 10 also comprises beveled guides 1088A-B, attached to the two opposing sides of the apparatus, and configured to guide collected nuts (not shown) out through semi-circular opening 1095 when gate 1055 is in the open position. The beveled guides may be attached by welding, brazing, bolting, screwing and/or riveting.

In some embodiments, the beveled plates 1088A-B may be the full height of the apparatus, or in other embodiments, the beveled guides 1088A-B may be only a fraction of the height of the apparatus. In some embodiments, multiple beveled guides attached to each of the two opposing sides may be used to direct the flow of nuts to the opening 1095.

In view of the exemplary systems described supra, methodologies that may be implemented in accordance with the disclosed subject matter can be appreciated with reference to the various figures. While for purposes of simplicity of explanation, the methodologies are described as a series of steps, it is to be understood and appreciated that the disclosed subject matter is not limited by the order of the steps, as some steps may occur in different orders and/or concurrently with other steps from what is described herein. Moreover, not all disclosed steps may be required to implement the methodologies described hereinafter.

While the various embodiments have been described in connection with the exemplary embodiments of the various figures, it is to be understood that other similar embodiments may be used or modifications and additions may be made to the described embodiment for performing the same function without deviating therefrom. Therefore, the present invention should not be limited to any single embodiment.

What is claimed is:

1. An apparatus for moving the ends of windrows inward, the apparatus comprising:
    a front end;
    a rear end having a semicircular opening configured to assist in the distribution of the fruit and/or nuts;
    two sides, each side attached to the rear end at an angle such that the front end, the rear end and the two sides form a funnel-like frame;
    two skids, one attached to each of the two sides;
    a gate operably attached to the rear end and configured to cover an opening in the rear end;
    a gate cylinder operably attached to the gate and configured to:
    close the gate to accumulate fruit and/or nuts within the apparatus; and
    open the gate to ratably distribute the fruit and/or nuts through the opening in the rear end.

2. The apparatus of claim 1, wherein (i) the apparatus is configured to be attached to and move with a transport vehicle, and (ii) operation of the gate and movement of the apparatus ratably disperse the fruit and/or nuts.

3. The apparatus of claim 2, wherein the gate cylinder is operated by a mechanism on the transport vehicle.

4. The apparatus of claim 2, further comprising one or more arms operably attached to the transport vehicle and configured to raise and/or lower the apparatus in relation to the transport vehicle.

5. The apparatus of claim 4, wherein the one or more arms comprise three arms.

6. The apparatus of claim 1, further comprising at least two beveled guides, each of the at least two beveled guides attached to one of the opposing sides and configured to further funnel the fruit and/or nuts toward an opening in the rear end.

7. An apparatus for moving the ends of windrows inward, the apparatus comprising:
    a front end;
    a rear end;
    two sides, each side attached to the rear end at an angle such that the front end, the rear end and the two sides form a funnel-like frame;
    two skids, one attached to each of the two sides;
    a gate operably attached to the rear end and configured to cover an opening in the rear end;
    a gate cylinder operably attached to the gate and configured to:
    close the gate to accumulate fruit and/or nuts within the apparatus; and
    open the gate to ratably distribute the fruit and/or nuts outside of the apparatus, and wherein (i) the apparatus is configured to be attached to and move with a transport vehicle, and (ii) operation of the gate and movement of the apparatus ratably disperse the fruit and/or nuts.

8. The apparatus of claim 7, wherein the opening in the rear end is semicircular.

9. The apparatus of claim 7, further comprising at least two beveled guides, each of the at least two beveled guides attached to at least one of the sides and configured to further funnel the fruit and/or nuts toward an opening in the rear end.

10. The apparatus of claim 7, further comprising one or more arms operably attached to the transport vehicle and configured to raise and/or lower the apparatus in relation to the transport vehicle.

11. A method for moving the ends of windrows inward, the method comprising:
    (a) operably attaching an apparatus to a transport vehicle, the apparatus comprising:
        i. a front end;
        ii. a rear end;
        iii. two sides, each side attached to the rear end at an angle such that the front end, the rear end and the two sides form a funnel-like apparatus;
        iv. two skids, one attached to each of the two sides;

v. a gate operably attached to the rear end and configured to cover an opening in the rear end;
vi. a gate cylinder operably attached to the gate and configured to close the gate to accumulate fruit and/or nuts within the apparatus, and open the gate to distribute the fruit and/or nuts outside of the apparatus; and
vii. one or more arms, operably attached to the transport vehicle and configured to raise and/or lower the apparatus in relation to the transport vehicle;

(b) approaching a first end of a windrow with the gate in a lowered position;
(c) moving the transport vehicle and the apparatus over the first end of one of the windrows;
(d) accumulating the fruit and/or nuts within the apparatus by continuing to move the transport vehicle; and
(e) operating a mechanism to open the gate at a predetermined time and/or distance from the first end of the windrow.

12. The method of claim 11, further comprising: (f) raising the apparatus in relation to the transport vehicle; (g) moving the transport vehicle and the apparatus out of the windrow; and (h) repeating steps (b) through (g) for successive windrows.

13. The method of claim 12, further comprising (i) moving the transport vehicle and the apparatus to a second end of one of the windrows, and repeating steps (b) through (g) for successive second ends of the windrows.

* * * * *